Patented Feb. 17, 1953

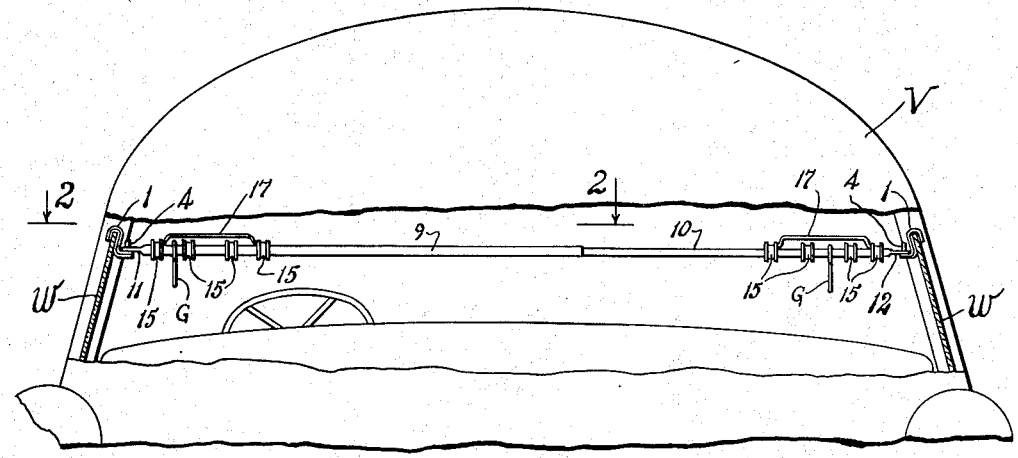
Fig. 1
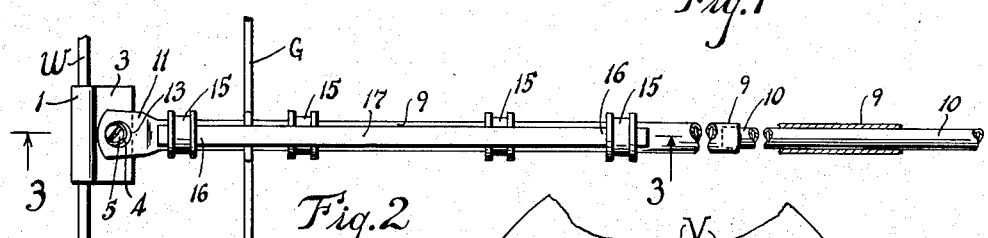
Fig. 2
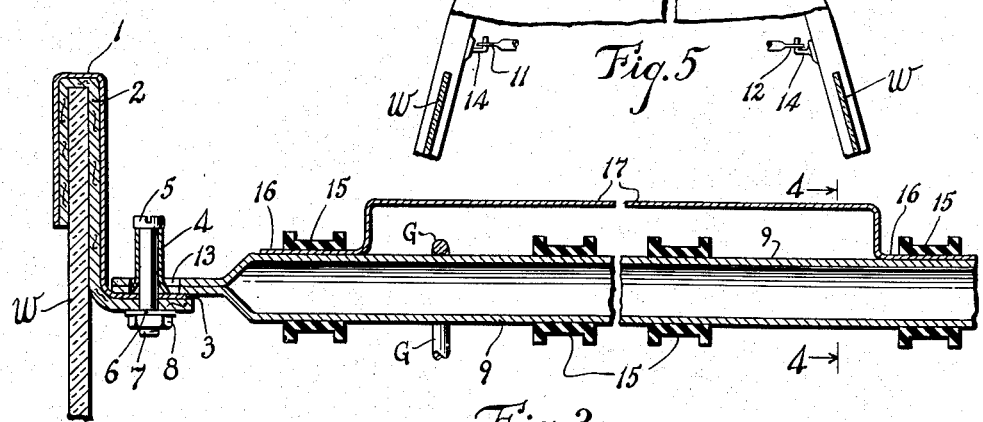
Fig. 3 / Fig. 5
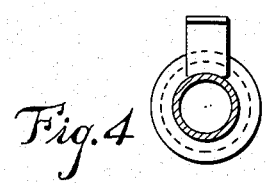
Fig. 4

2,628,751

UNITED STATES PATENT OFFICE 2,628,751

DEMOUNTABLE GARMENT HANGER

Vern W. Bain, Van Nuys, Calif.

Application August 29, 1949, Serial No. 112,884

2 Claims. (Cl. 224—42.1)

This invention relates to garment hangers and particularly to a form thereof adapted to be installed in the passenger compartment of automobiles.

An object of the present invention is to provide a garment hanger supporting means for automobiles which may be installed either on the upper edges of the vehicle windows or upon supporting hooks permanently attached to the roof or sidewall structure of the vehicle.

Another object of the invention is to provide a garment hanger supporting means for motor vehicles which may be installed upon hooks mounted on the upper edge of the vehicle windows and which may be removed from the supporting hooks without the necessity of removing the hooks from the windows.

A further object of the invention is to provide a garment hanger supporting means for motor vehicles which may be installed upon the upper edges of the windows on opposite sides of the vehicle and which is so constructed and arranged that either of the windows upon which it is mounted may be vertically adjusted to different levels if desired.

With the above objects in view, together with such other objects and advantages as may subsequently appear, the invention resides in the parts, and in the construction, combination and arrangement of parts described in the following specification and illustrated in the accompanying drawings, which show, by way of example, one form of the invention and in which drawings:

Fig. 1 is a fragmentary front elevation of a motor vehicle, in which a garment hanger support of the present invention is installed, portions of the vehicle being broken away for clearness of illustration, Fig. 2 is an enlarged, fragmentary top plan view partly in section, taken generally in the area indicated by the line 2—2 of Fig. 1, Fig. 3 is a further enlarged medial sectional view taken on the line 3—3 of Fig. 2, Fig. 4 is a transverse sectional view taken on the line 4—4 of Fig. 3, and Fig. 5 is a fragmentary side elevation of the device showing the mode of mounting it on one of a pair of oppositely disposed hooks permanently attached to the interior of the vehicle.

Referring first to Fig. 1, there is shown a vehicle V, having a pair of windows W—W on either side of the rear portion of the passenger compartment, which windows are mounted for vertical movement as is customary in motor vehicles.

Mounted on the upper edge of each window is a metal hook element 1, having a lining of felt or like material 2, engaging the side surface of the window. On the inner face of the window, the hook element 1, has an inwardly, laterally, projecting shelf portion 3 on the upper face of which a sleeve 4 is secured by a bolt 5 extending downwardly through the sleeve, thence through the shelf portion 3, the end of the lining 2, and a washer 6, and terminating in a threaded portion engaged by a nut 8. Thus, the bolt 5 not only secures the sleeve 4 to the upper surface of the shelf member 3, but also secures the lining element 2 to the hook element.

The garment hanger support comprises a pair of telescoping rods 9 and 10 having flattened ends 11 and 12 which ends are provided with relatively large openings as at 13 in Figs. 2 and 3, which loosely engage the upstanding post elements formed by the sleeves 4 and bolts 5 on each of the hook members 1. Because of the telescoping arrangement of the tubes, when the device is installed on the windows of the rear doors of the vehicle, either door may be opened and closed, such movement being permitted by the sliding engagement of the tubes 9 and 10, together with the hinging action of the engagement between the flattened ends of the tubes and their respective post elements on the hook members 1. Additionally, the clearance afforded by the large opening 13, permits either window to be raised or lowered relative to the other with incident inclination of the rod assembly without such action producing a binding or cramping effect on the windows as has characterized prior art devices. Furthermore, this loose engagement assists in the installation of the device since the hooks can first be separately applied to the vehicle windows and the rod assembly can then be assembled on to the upstanding post elements on each of the supporting hooks. Still further, because of the telescoping sliding engagement of the members 9 and 10, the device is applicable to a wide range of vehicle widths, although for installations on vehicle windows other than door windows, the rod may be made of a single element of the correct length.

As shown in Fig. 5, the installation of the rod assembly is not confined to the window engaging hooks. It may be installed with equal ease on hooks 14, 14, applied to the door posts or to the roof structure of the vehicle as indicated in Fig. 5.

The device also includes a simple means for keeping garment hangers hung on the rod assembly separated from each other for clearance of the garments, and for confining the garments to the extreme ends of the rod assembly so as not to impair the driver's view to the rear of the vehicle through the usual rear vision mirror and the rear window of the vehicle. The arrangements on each end of the rod assembly are similar except those on the smaller member 10 are reduced in size to accommodate the smaller rod. Each assembly comprises a series of resilient rubber rings 15, tightly but slideably engaging the respective rod elements 9 and 10. The outermost of these rings additionally clamp the laterally extending legs 16 and 16 of a shallow inverted U-shaped strip of metal 17 to the outer upper surface of the rod members. This member extends above the rod and above the intermediate ring elements 15 and operates to prevent a garment hanger G from being dislodged from the rod incident to any violent upward movement of the vehicle body such as would be produced by going over rough spots in the highway and thus, the member 17 assists in maintaining the garment hangers and the garments carried thereby in place on this supporting rod structure.

The device is composed of few parts, and all of the parts either are such as may be purchased on the open market, or such as do not require expensive tooling for manufacture, and consequently, the device is economical to manufacture. It is simple in construction, and can be readily installed on motor vehicles and can be as readily removed as occasion may require. It is to be noted that, if desired, the rod and any garments hung thereon may be removed from, or placed in the vehicle as a unit without releasing the supporting hooks from the windows.

While I have shown and described one form of my invention, I do not intend thereby to be limited to the exact form thus disclosed, and the invention includes all such modifications of the parts, and of the construction, combination and arrangement of parts, as shall come within the purview of the appended claims.

I claim:

1. A demountable garment hanger for motor vehicles comprising a pair of telescopically interengaging tubular members combining to form a garment supporting rod; each of said tubular members at the end thereof remote from the point of interengagement being flattened and having a hole extending through said flattened end, and a pair of hook elements demountably supporting said rod transversely of a vehicle; each of said hook elements comprising a strip of metal bent on itself to form a hook portion engaging the upper edge and adjacent side faces of a vehicle window and having a resilient lining engaging the edge and sides of the window; the portion of each of said hook elements engaging the inner side of the window extending below the end of the hook portion engaging the outer surface of the window and terminating in a laterally extending rod supporting ledge having an upwardly extending stud extending through the holes in said flattened ends; the thinness of said flattened end portions and the clearance between each of said studs and the associated hole in said flattened ends being sufficient to permit the unobstructed raising and lowering of either vehicle window engaged by said hooks relative to the opposite window.

2. In a demountable garment hanger as claimed in claim 1, the combination of hanger positioning means comprising a pair of members located one at each end of said rod adjacent said flattened ends thereof; each of said members comprising a bar spaced from the upper surface of said rod and extending parallel thereto and having its ends secured to the surface of said rod.

VERN W. BAIN.

REFERENCES CITED

The following references are of record in the file of this patent:

UNITED STATES PATENTS

| Number | Name | Date |
|---|---|---|
| 1,282,174 | Bescher | Oct. 22, 1918 |
| 1,716,708 | Shipley et al. | June 11, 1929 |
| 1,897,107 | Baus | Feb. 14, 1933 |
| 2,115,323 | Wuest | Apr. 26, 1938 |
| 2,334,036 | Roller | Nov. 9, 1943 |
| 2,344,339 | Zwald | Mar. 14, 1944 |
| 2,474,513 | Behrens | June 28, 1949 |
| 2,478,337 | Strasser et al. | Aug. 9, 1949 |
| 2,499,560 | Bailey | Mar. 7, 1950 |
| 2,522,174 | Hermsmeyer | Sept. 12, 1950 |
| 2,526,285 | Schuyler | Oct. 17, 1950 |
| 2,532,909 | Hart | Dec. 5, 1950 |
| 2,549,391 | Secord | Apr. 17, 1951 |

FOREIGN PATENTS

| Number | Country | Date |
|---|---|---|
| 822,313 | France | Sept. 13, 1937 |